Figure 1:
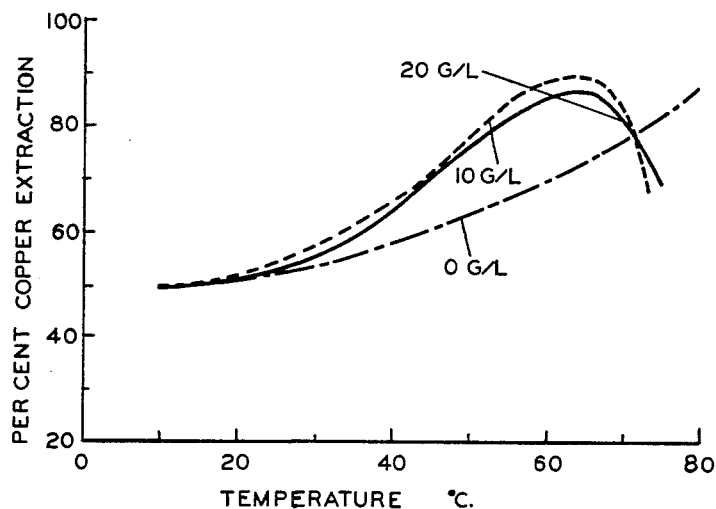

United States Patent Office 2,727,819
Patented Dec. 20, 1955

2,727,819

METHOD OF LEACHING SULFIDE COPPER MATERIALS WITH AMMONIACAL SOLVENT

Herman C. Kenny, Lake Linden, and Helmer A. Abramson, Hancock, Mich., assignors to Calumet & Hecla, Inc., a corporation of Michigan Application December 1, 1951, Serial No. 259,447

8 Claims. (Cl. 75—103)

This invention relates to the recovery of copper values from copper sulfides, especially ores such as chalcocite, covellite, bornite and chalcopyrite.

It has been proposed heretofore to dissolve copper sulfides by aeration, with agitation, in ammonia or ammoniacal ammonium carbonate solution. The latter is effective, although leaving much to be desired in rate of solution.

It has now been discovered, in accordance with the present invention, that by suitably controlling both the temperature and the concentration of copper in solution, it is possible to speed up the process to an important extent.

In the case of cuprous sulfide ($Cu_2S$) or an ore containing copper chiefly as cuprous sulfide, one atom of copper in each molecule dissolves rather readily, leaving $CuS$, but the second atom, the $Cu$ from $CuS$, dissolves only with great difficulty at room temperature or in the absence of copper or other promoter. Air or oxygen or other source of oxygen must also be present and must contact the cupriferous material and the solution.

The function of the copper appears to be to catalyze the oxidation of thiosulfate to sulfite and sulfate, and probably also to promote oxidation and solution of one atom of copper from $Cu_2S$. Unless the temperature is elevated and copper or other promoter is present, oxidation proceeds very slowly and a greater length of time is required for the reaction. Upon formation of sulfite from sulfide, which may or may not be a simple reaction, the sulfite appears to add an atom of sulfur (picked up from copper sulfide) to form thiosulfate, which in turn is oxidized (the oxidation being catalyzed by copper) to form sulfite and sulfate. Probably the mechanism is as follows:

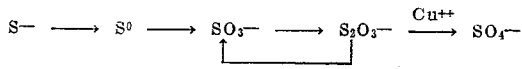

The oxidation from $S^{--}$ to $S^0$ to $SO_3^{--}$ proceeds very slowly, at room temperature or in the absence of a promoter, but, once the $SO_3^{--}$ is present in sufficient concentration, such concentration is maintained. Even though sulfite be added, solution does not proceed at a satisfactory rate at room temperature, nor in the absence of good contact between the sulfide, the solid component of the reaction mixture, the solution which contains the sulfite, and the oxidizing agent, the gas phase.

Experimental evidence appears to confirm the foregoing theory. For example, when all other conditions are at optimum, substituting nitrogen for air will substantially stop the reaction. Again, withdrawing the liquid phase from the reaction mixture, aerating it and returning it fails to give good results in the absence of further aeration, even when the solid and liquid are stirred mechanically and other conditions are at optimum. Cupric sulfide shows no appreciable solution in two hours at room temperature (70° F.) in ammoniacal ammonium carbonate solution with or without any promoter, although aeration and agitation are at optimum. Cuprous sulfide, under the same conditions, goes into solution but slowly, about 65% in five hours at room temperature, as against 65% in two hours at 60° C. and 85% in two hours with promoter at 60° C. The fact that cuprous sulfide dissolves as well as it does at room temperature without any promoter is due to the relative ease with which the first atom of copper dissolves, leaving the more difficultly soluble cupric sulfide. Solution of 65% of cuprous sulfide in five hours would mean that the undissolved residue was all cupric sulfide, only 15% having dissolved from cupric copper. X-ray determinations showed that after above 50% of the copper has been dissolved from chalcocite ($Cu_2S$) there remains only the crystal pattern characteristic of covellite ($CuS$). The appearance is also that of covellite, and the proportions of $Cu$ and $S$ are the same as in $CuS$.

When cuprous sulfide is dissolved in ammoniacal ammonium carbonate solution with aeration at room temperature, the reaction is comparatively slow in spite of the relative ease with which the first atom of copper dissolves. Because of the low temperature and the slow rate of formation of sulfite, time in the order of 24 hours or more is required to take 90% of the copper content of $Cu_2S$ into solution. If the temperature is raised to 40° C., in the absence of any initially added promoter about 62% of the copper goes into solution in two hours, as compared with about 50% at room temperature. Using 20 grams per liter of dissolved copper in the starting solution, the result was about 65% at 40° C. and nearly 90% at 60° C., the time in both instances being two hours. Continuing for longer periods of time a closer approach can be made to complete extraction. Using pure oxygen, almost 100% extraction was achieved in two hours at 20 g./l. initial copper concentration. Since the copper can be taken from the process, and the elevation of temperature is probably necessary in any economically desirable method of recovering the copper from the solution, it can be seen that cost considerations are favorable.

Figure 2:
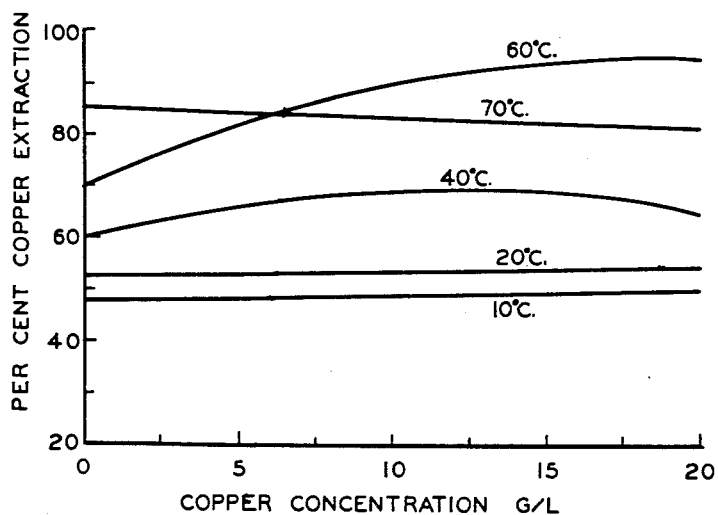

In the accompanying drawings, Fig. 1 is a graphic representation of the relationship of copper extraction to temperature, with starting solutions free of copper and containing 10 and 20 grams per liter of copper; and Fig. 2 is a graphic representation of the relationship of copper extraction to copper concentration in the starting solution at various temperatures.

The copper ion may be added in any convenient form, e. g. copper sulfate, copper carbonate, copper sulfite, copper thiosulfate, and copper ammino compounds such as copper ammonium carbonate, sulfate, sulfite and thiosulfate. Preferably it is added in the form of rich leach solution from the process itself, preferably aerated to oxidize $S_2O_3^{--}$ ion to $SO_4^{--}$ ion. That is, there may be withdrawn from the reaction mixture from time to time or continuously such portions as to leave a suitable copper concentration, or each batch may be made up with rich leach solution (preferably aerated) plus such additions as are necessary.

Both cuprous and cupric sulfides are dissolved at increased rate at suitable copper concentrations and suitably elevated temperature, but cupric sulfide is not attacked as rapidly as is cuprous sulfide.

It has been found that nearly half the copper in $Cu_2S$ dissolves fairly quickly, without any catalyst, in the ammonia-ammonium carbonate leach solution. Also, the amount of copper dissolved according to the present invention levels off about fifty percent higher in the case of $Cu_2S$ than in the case of $CuS$. That is, copper extraction in the case of $Cu_2S$ is about equal to copper extraction in the case of $CuS$ plus fifty percent of the contained copper in the $Cu_2S$.

It is not known with certainty how the promoters function, but it is known that thiosulfate ion ($S_2O_3^{--}$) is oxidized by air or oxygen in the presence of $Cu^{++}$ to $SO_3^{--}$ plus $SO_4^{--}$, and that $SO_3^{--}$ reacts with CuS to form $S_2O_3^{--}$. The formation of $SO_3^{--}$ in the leach solution which initially contains only ammoniacal ammonium carbonate is not understood, but it does seem to take place. In the case of CuS (synthetic or Covellite) at room temperature, the rate is so slow that CuS was at first reported to be insoluble. In the case of $Cu_2S$, the rate is appreciable, one atom of copper in each molecule being relatively soluble, resulting in faster buildup of $Cu^{++}$ ion. With $Cu^{++}$ ion initially present (e. g., 20 g./l.) solution proceeds more rapidly, especially so at elevated temperatures. It is probable, therefore, that the presence of copper ion may not only promote oxidation of $S_2O_3^{--}$ to $SO_3^{--}$ and $SO_4^{--}$, but may also catalyze the oxidation of CuS to yield $SO_3^{--}$ ion. In the case of $Cu_2S$ materials, the production of $SO_3^{--}$ from CuS takes place to a substantial extent even while the first atom of Cu is dissolving from $Cu_2S$ leaving CuS. Initial presence of $Cu^{++}$ ion also catalyzes solution of the first atom of Cu from $Cu_2S$.

The basic leaching solution which is preferred according to the invention may be called aqueous, ammoniacal, ammonium-carbonate solution. It may be conveniently described by specifying the content of $NH_3$, $CO_2$ and $H_2O$. Since these are the basic constituents of the starting material and copper probably in complex form, concentrations of $NH_3$, $CO_2$ and Cu will be indicated hereinafter in grams per liter, it being understood that the remainder is water except for sulfur, impurities and addition agents. Sulfur dissolves to an extent to indicate that the first Cu from $Cu_2S$ dissolves without very much solution of sulfur, and the Cu from CuS dissolves only when its sulfur also dissolves.

rate of dissolution goes down. If pressure is employed, a higher temperature, e. g. 100° C., becomes practical; and when oxygen is used instead of air, a temperature of 75° C. is feasible at atmospheric pressure. If the ammonia concentration is reduced, the temperature can be increased. The maximum temperature is reached when the partial pressure of $NH_3$ reaches the maximum permissible pressure. Pressures above one atmosphere, e. g., up to 60 atmospheres are quite satisfactory and, as indicated, the pressure selected determines the temperature which can be used. For a two-hour leach at atmospheric pressure, 20 grams per liter initial copper concentration and a temperature of 60° C., $NH_3$ concentration 120 g./l., $CO_2$ concentration 50 g./l., constitute about optimum conditions, yielding above 90% extraction in two hours from about 100 g./l. of chalcocite assaying 26% Cu.

Either air or oxygen may be used, and should be passed through the solution during the reaction at a rate to hold at least a part of the ore or compound in suspension and, preferably, at a rate to maintain all or nearly all the ore or compound being dissolved in suspension in the liquid phase. It is to be understood that the ore or other copper sulfide material is finely divided. It should be 100 mesh or finer, but some coarser material can be tolerated in the reaction mixture. It is desirable also to introduce the air or oxygen in the form of small-sized bubbles, e. g., through a porous block, a nozzle or a jet, as this speeds up the reaction.

Although ammonium carbonate solution is preferable, sulfate can be substituted for carbonate, mol for mol, and the invention can be practiced without either, although solution is less rapid if neither is used.

The following specific examples will serve to illustrate the invention:

*Table II*

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Amount of $Cu_2S$ (g.) | 8.17 | 8.17 | 8.17 | 8.17 | 8.17 | 8.17 | 8.17 | 8.17 | 8.17 | 8.17 | 8.17 | 8.17 | 8.17 | 8.17 | 8.17 |
| Amount of solution (ml.) | 250 | 250 | 250 | 250 | 250 | 250 | 250 | 250 | 250 | 250 | 250 | 250 | 250 | 250 | 250 |
| Temperature (° C.) | 10 | 20 | 40 | 60 | 70 | 10 | 20 | 40 | 60 | 70 | 10 | 20 | 40 | 60 | 70 |
| Amount of air (l./min.) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Copper at start | | | | | | 9.8 | 9.8 | 9.8 | 8.96 | 9.8 | 20.1 | 20.1 | 20.1 | 20.1 | 20.1 |
| $NH_3$ (g./l.) | 120 | 120 | 120 | 120 | 120 | 120 | 120 | 120 | 120 | 120 | 120 | 120 | 120 | 120 | 120 |
| $CO_2$ (g./l.) | 50 | 50 | 50 | 50 | 50 | 50 | 50 | 50 | 50 | 50 | 50 | 50 | 50 | 50 | 50 |
| Leaching time (hrs.) | 2 | 2 | 2 | 2 | 2 | 2 | 2 | 2 | 2 | 2 | 2 | 2 | 2 | 2 | 2 |
| Copper dissolved (percent total Cu in sample) | 47.2 | 50.9 | 61.7 | 67.9 | 82.4 | 47.8 | 52.3 | 68.4 | 87.8 | 81.4 | 48.6 | 52.3 | 64.9 | 88.4 | 80.4 |

The following table shows operating ranges in grams per liter which may be used satisfactorily.

*Table I*

$NH_3$, 40 to 200, preferably 60 to 120
$CO_2$, 15 to 100, preferably 20 to 50
Cu [1] (dissolved), 5 to 100, preferably 10 to 50
Copper sulfide [2] (solid phase), 2 to 100, preferably 10 to 50 (Cu content)
$SO_3^{--}$ ion and/or $S_2O_3^{--}$ ion, 0 to 15, preferably 0.3 to 5.0
$SO_4^{--}$ ion may be present; not useful but not objectionable
$O_2$ (air or oxygen) is passed through the mixture during reaction at a rate at least enough to suspend the ore, and, ordinarily, at least 2½ and preferably 3 or more atoms of oxygen per atom of Cu in the copper sulfide material treated. It will be understood that ammonia evolved will be recovered for re-use in the process.

[1] Solution of copper may be carried to saturation but the limits indicated are recommended.
[2] Extraction is improved if ores or concentrates are dried before being subjected to leaching.

Temperature of the reaction mixture is of great importance and should be kept within the limits from 35° C. to 70° C., preferably within the limits from 40° C. to 65° C. At low temperatures the reaction slows down, while at too high temperatures ammonia escapes and the Table II is the source of information for the drawings, which are only approximately accurate.

$Cu_2S$ above is the $Cu_2S$ content of chalcocite ore.

Once the copper content of the copper sulfide material has been taken into solution, it can be precipitated by known methods, for example, by distilling off the ammonia and $CO_2$ or a portion thereof.

Having thus described the invention, what is claimed is:

1. In a process for recovering copper value from copper sulfide material, the step of contacting a batch of said material in finely divided, solid state with an oxygen-containing gas and an ammoniacal leach solution initially containing in solution 40 to 200 grams per liter of $NH_3$, a substance of the class consisting of $CO_2$ and $SO_4$ in quantity molecularly equivalent to from 15 to 100 grams per liter of $CO_2$, and at least 5 grams per liter of Cu, with agitation and in a temperature range from 35° C. to 70° C., said copper sulfide material being immersed in said solution and said oxygen-containing gas being passed therethrough.

2. A process according to claim 1 wherein further the agitation of the leach solution is sufficient to maintain a major portion of the solid phase in suspension.

3. In a process for recovering copper value from copper sulfide material, the step of contacting a batch of said material in finely divided, solid state with an oxygen-containing gas and an ammoniacal ammonium carbonate leach solution initially containing in solution 60 to 120 grams per liter of $NH_3$, 20 to 50 grams per liter of $CO_2$, 10 to 50 grams per liter of Cu, with agitation and in a temperature range from 40° C. to 65° C., said copper sulfide material being immersed in said solution and said oxygen-containing gas being passed therethrough.

4. A process according to claim 3 wherein further the agitation of the leach solution is sufficient to maintain a major portion of the solid phase in suspension.

5. In a process for recovering copper value from copper sulfide material, the step of contacting a batch of said material in finely divided, solid state with an oxygen-containing gas and an ammoniacal ammonium carbonate leach solution initially containing in solution 40 to 200 grams per liter of $NH_3$, 15 to 100 grams per liter of $CO_2$ and 5 to 100 grams per liter of Cu, with agitation and in a temperature range from 35° C. to 70° C. when the pressure is one atmosphere and up to 100° C. when the pressure is above one atmosphere and is controlled with respect to the ammonia concentration to maintain the latter in solution at at least a concentration approximately equal to its maximum solubility in the leach solution at 65° C. and atmospheric pressure, said copper sulfide material being immersed in said solution and said oxygen-containing gas being passed therethrough.

6. In a process for recovering copper value from copper sulfide material, the step of contacting a batch of said material in finely divided, solid state with substantially pure oxygen and an aqueous, ammoniacal leach solution initially containing an ammonium salt of the class consisting of carbonate and sulfate and also initially containing in solution from 5 to 100 grams per liter of copper and being maintained in the temperature range from 35° C. to 75° C., said copper sulfide material being immersed in said solution and said oxygen-containing gas being passed therethrough.

7. In a process for recovering copper value from copper sulfide material, the step of contacting a batch of said maerial in finely divided, solid state, with an oxygen-containing gas and an aqueous, ammoniacal leach solution initially containing in solution from 40 to 200 grams per liter of $NH_3$ and from 5 to 100 grams per liter of Cu, with agitation sufficient to maintain the solid phase in suspension, at a temperature from 35° C. to 100° C. and pressure adequate to maintain said concentration of $NH_3$, said copper sulfide material being immersed in said solution and said oxygen-containing gas being passed therethrough.

8. In a process for recovering copper value from copper sulfide material, the step of contacting a batch of said material in finely divided, solid state, with an oxygen-containing gas and an aqueous, ammoniacal leach solution initially containing in solution from 40 to 200 grams per liter of $NH_3$, from 15 to 100 grams per liter of $CO_2$, and from 5 to 100 grams per liter of Cu, with agitation sufficient to maintain the solid phase in suspension, at a temperature from 35° C. to 100° C. and pressure adequate to maintain said concentration of $NH_3$, said copper sulfide material being immersed in said solution and said oxygen-containing gas being passed therethrough.

References Cited in the file of this patent
UNITED STATES PATENTS

| | | |
|---|---|---|
| 702,047 | Collins | June 10, 1902 |
| 1,131,986 | Benedict | Mar. 16, 1915 |
| 1,451,734 | Irving | Apr. 17, 1923 |
| 1,516,356 | Taplin | Nov. 18, 1924 |
| 2,576,314 | Forward | Nov. 27, 1951 |